(12) United States Patent
Yu et al.

(10) Patent No.: US 8,766,995 B2
(45) Date of Patent: Jul. 1, 2014

(54) GRAPHICS SYSTEM WITH CONFIGURABLE CACHES

(75) Inventors: Chun Yu, San Diego, CA (US);
Guofang Jiao, San Diego, CA (US);
Yun Du, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 11/412,678

(22) Filed: Apr. 26, 2006

(65) Prior Publication Data

US 2007/0252843 A1 Nov. 1, 2007

(51) Int. Cl.
*G09G 5/36* (2006.01)
*G06T 1/20* (2006.01)

(52) U.S. Cl.
USPC .......................................... 345/557; 345/506

(58) Field of Classification Search
CPC .......... G06T 1/00–1/0092; G06T 1/20; G09G 5/36–5/366
USPC ................. 345/506, 557, 535, 501, 502, 530; 711/118, 119, 122, 151, 153, 152
See application file for complete search history.

(56) References Cited

U.S. PATENT DOCUMENTS

| | | | |
|---|---|---|---|
| 3,469,244 A | 9/1969 | Perotto | |
| 4,079,452 A | 3/1978 | Larson et al. | |
| 4,361,868 A | 11/1982 | Kaplinsky | |
| 5,517,611 A | 5/1996 | Deering | |
| 5,590,326 A | 12/1996 | Manabe | |
| 5,598,546 A | 1/1997 | Blomgren | |
| 5,777,629 A | 7/1998 | Baldwin | |
| 5,793,385 A | 8/1998 | Nale | |
| 5,794,016 A | 8/1998 | Kelleher | |
| 5,798,770 A | 8/1998 | Baldwin | |
| 5,831,640 A | 11/1998 | Wang et al. | |
| 5,870,579 A | 2/1999 | Tan | |
| 5,872,729 A | 2/1999 | Deolaliker | |

(Continued)

FOREIGN PATENT DOCUMENTS

| | | |
|---|---|---|
| EP | 0627682 A1 | 12/1994 |
| EP | 0676691 A2 | 10/1995 |

(Continued)

OTHER PUBLICATIONS

Blamer K et al., "A Single Chip Multimedia Video Processor," Custom Integrated Circuits Conference, 1994, Proceedings of HTE IEEE 1994, San Diego, CA, USA, New York, NY, USA, IEEE, May 1, 1994, pp. 91-94.

(Continued)

*Primary Examiner* — Jacinta M Crawford
(74) *Attorney, Agent, or Firm* — James R. Gambale, Jr.

(57) ABSTRACT

A graphics system includes a graphics processor and a cache memory system. The graphics processor includes processing units that perform various graphics operations to render graphics images. The cache memory system may include fully configurable caches, partially configurable caches, or a combination of configurable and dedicated caches. The cache memory system may further include a control unit, a crossbar, and an arbiter. The control unit may determine memory utilization by the processing units and assign the configurable caches to the processing units based on memory utilization. The configurable caches may be assigned to achieve good utilization of these caches and to avoid memory access bottleneck. The crossbar couples the processing units to their assigned caches. The arbiter facilitates data exchanges between the caches and a main memory.

33 Claims, 7 Drawing Sheets

(56) References Cited

U.S. PATENT DOCUMENTS

| | | |
|---|---|---|
| 5,913,059 A | 6/1999 | Torii |
| 5,913,925 A | 6/1999 | Kahle et al. |
| 5,949,920 A | 9/1999 | Jordan et al. |
| 5,958,041 A | 9/1999 | Petolino, Jr. et al. |
| 5,991,865 A | 11/1999 | Longhenry et al. |
| 6,092,175 A | 7/2000 | Levy et al. |
| 6,188,411 B1 | 2/2001 | Lai |
| 6,219,769 B1 | 4/2001 | Strongin et al. |
| 6,226,604 B1 | 5/2001 | Ehara et al. |
| 6,279,099 B1 | 8/2001 | Van Hook et al. |
| 6,466,221 B1 | 10/2002 | Satoh et al. |
| 6,480,941 B1 | 11/2002 | Franke et al. |
| RE37,944 E | 12/2002 | Fielder et al. |
| 6,493,741 B1 | 12/2002 | Emer et al. |
| 6,515,443 B2 | 2/2003 | Kelly et al. |
| 6,516,443 B1 | 2/2003 | Zook |
| 6,549,209 B1 | 4/2003 | Shinohara et al. |
| 6,570,570 B1 | 5/2003 | Suzuki et al. |
| 6,574,725 B1 | 6/2003 | Kranich et al. |
| 6,577,762 B1 | 6/2003 | Seeger et al. |
| 6,593,932 B2 | 7/2003 | Porterfield |
| 6,614,847 B1 | 9/2003 | Das et al. |
| 6,636,214 B1 | 10/2003 | Leather et al. |
| 6,654,428 B1 | 11/2003 | Bose et al. |
| 6,693,719 B1 * | 2/2004 | Gupta et al. ............... 358/1.15 |
| 6,697,063 B1 | 2/2004 | Zhu |
| 6,717,583 B2 | 4/2004 | Shimomura et al. |
| 6,734,861 B1 | 5/2004 | Van Dyke et al. |
| 6,744,433 B1 | 6/2004 | Bastos et al. |
| 6,792,575 B1 | 9/2004 | Samaniego et al. |
| 6,807,620 B1 | 10/2004 | Suzuoki et al. |
| 6,825,843 B2 | 11/2004 | Allen et al. |
| 6,891,533 B1 | 5/2005 | Alcorn et al. |
| 6,891,544 B2 | 5/2005 | Oka et al. |
| 6,950,927 B1 | 9/2005 | Apisdorf et al. |
| 6,952,213 B2 | 10/2005 | Ebihara |
| 6,952,440 B1 | 10/2005 | Underbrink |
| 6,958,718 B2 | 10/2005 | Symes et al. |
| 6,964,009 B2 | 11/2005 | Samaniego et al. |
| 6,972,769 B1 | 12/2005 | Nebeker et al. |
| 6,999,076 B2 | 2/2006 | Morein |
| 7,006,881 B1 | 2/2006 | Hoffberg et al. |
| 7,015,913 B1 | 3/2006 | Lindholm et al. |
| 7,015,914 B1 | 3/2006 | Bastos et al. |
| 7,027,062 B2 | 4/2006 | Lindholm et al. |
| 7,027,540 B2 | 4/2006 | Wilson et al. |
| 7,030,878 B2 | 4/2006 | Xu et al. |
| 7,034,828 B1 | 4/2006 | Drebin et al. |
| 7,068,272 B1 | 6/2006 | Voorhies et al. |
| 7,088,371 B2 | 8/2006 | Lippincott |
| 7,098,922 B1 * | 8/2006 | Bastos et al. .................. 345/506 |
| 7,130,443 B1 | 10/2006 | Werner et al. |
| 7,145,565 B2 | 12/2006 | Everitt et al. |
| 7,146,486 B1 | 12/2006 | Prokopenko et al. |
| 7,174,224 B2 | 2/2007 | Hudson et al. |
| 7,196,708 B2 | 3/2007 | Dorojevets et al. |
| 7,239,322 B2 | 7/2007 | Lefebvre et al. |
| 7,239,735 B2 | 7/2007 | Nozaki |
| 7,268,785 B1 | 9/2007 | Glanville et al. |
| 7,339,592 B2 | 3/2008 | Lindholm et al. |
| 7,358,502 B1 | 4/2008 | Appleby et al. |
| 7,372,484 B2 | 5/2008 | Mouli |
| 7,379,067 B2 | 5/2008 | Deering et al. |
| 7,388,588 B2 | 6/2008 | D'Amora et al. |
| 7,447,873 B1 | 11/2008 | Nordquist |
| 7,557,832 B2 | 7/2009 | Lindenstruth et al. |
| 7,574,042 B2 | 8/2009 | Tsuruoka et al. |
| 7,583,294 B2 | 9/2009 | Ray et al. |
| 7,612,803 B2 | 11/2009 | Meitav et al. |
| 7,619,775 B2 | 11/2009 | Kitamura et al. |
| 7,633,506 B1 | 12/2009 | Leather et al. |
| 7,673,281 B2 | 3/2010 | Yamanaka et al. |
| 7,683,962 B2 | 3/2010 | Border et al. |
| 7,684,079 B2 | 3/2010 | Takata et al. |
| 7,733,392 B2 | 6/2010 | Mouli |
| 7,738,699 B2 | 6/2010 | Tsuruoka et al. |
| 7,808,505 B2 | 10/2010 | Deering et al. |
| 7,813,822 B1 | 10/2010 | Hoffberg |
| 7,826,092 B2 | 11/2010 | Ejima et al. |
| 7,904,187 B2 | 3/2011 | Hoffberg et al. |
| 7,920,204 B2 | 4/2011 | Miyanari |
| 7,966,078 B2 | 6/2011 | Hoffberg et al. |
| 7,987,003 B2 | 7/2011 | Hoffberg et al. |
| 8,046,313 B2 | 10/2011 | Hoffberg et al. |
| 8,054,573 B2 | 11/2011 | Mathew et al. |
| 8,154,818 B2 | 4/2012 | Mathew et al. |
| 8,165,916 B2 | 4/2012 | Hoffberg et al. |
| 2002/0091915 A1 | 7/2002 | Parady |
| 2003/0034975 A1 | 2/2003 | Lindholm et al. |
| 2003/0080959 A1 | 5/2003 | Morein |
| 2003/0105793 A1 | 6/2003 | Guttag et al. |
| 2003/0167379 A1 * | 9/2003 | Soltis, Jr. ............... 711/119 |
| 2003/0172234 A1 * | 9/2003 | Soltis, Jr. ............... 711/122 |
| 2004/0030845 A1 * | 2/2004 | DeLano et al. ............... 711/150 |
| 2004/0119710 A1 | 6/2004 | Piazza et al. |
| 2004/0130552 A1 | 7/2004 | Duluk et al. |
| 2004/0169651 A1 | 9/2004 | Everitt et al. |
| 2004/0172631 A1 | 9/2004 | Howard |
| 2004/0187119 A1 | 9/2004 | Janik et al. |
| 2004/0246260 A1 * | 12/2004 | Kim et al. ............... 345/557 |
| 2005/0090283 A1 | 4/2005 | Rodriquez |
| 2005/0184994 A1 | 8/2005 | Suzuoki et al. |
| 2005/0195198 A1 * | 9/2005 | Anderson et al. ............ 345/506 |
| 2005/0206647 A1 | 9/2005 | Xu et al. |
| 2006/0004942 A1 * | 1/2006 | Hetherington et al. .......... 711/3 |
| 2006/0020831 A1 * | 1/2006 | Golla et al. ................... 713/300 |
| 2006/0028482 A1 | 2/2006 | Donovan et al. |
| 2006/0033735 A1 | 2/2006 | Seiler et al. |
| 2006/0066611 A1 | 3/2006 | Fujiwara et al. |
| 2006/0136919 A1 | 6/2006 | Aingaran et al. |
| 2007/0030280 A1 | 2/2007 | Paltashev et al. |
| 2007/0070075 A1 | 3/2007 | Hsu |
| 2007/0185953 A1 | 8/2007 | Prokopenko et al. |
| 2007/0236495 A1 | 10/2007 | Gruber et al. |
| 2007/0257905 A1 | 11/2007 | French et al. |
| 2007/0268289 A1 | 11/2007 | Yu et al. |
| 2007/0273698 A1 | 11/2007 | Du et al. |
| 2007/0283356 A1 | 12/2007 | Du et al. |
| 2007/0292047 A1 | 12/2007 | Jiao et al. |
| 2007/0296729 A1 | 12/2007 | Du et al. |
| 2008/0074433 A1 | 3/2008 | Jiao et al. |

FOREIGN PATENT DOCUMENTS

| | | |
|---|---|---|
| EP | 0917056 A2 | 5/1999 |
| JP | 3185521 A | 8/1991 |
| JP | 9062852 A | 3/1997 |
| JP | 9231380 A | 9/1997 |
| JP | 2000057365 A | 2/2000 |
| JP | 2001222712 | 8/2001 |
| JP | 2001236221 A | 8/2001 |
| JP | 2001357410 A | 12/2001 |
| JP | 2002269583 | 9/2002 |
| JP | 2002529870 A | 9/2002 |
| JP | 2006099422 A | 4/2006 |
| RU | 2137186 C1 | 9/1999 |
| RU | 2004109122 | 6/2007 |
| TW | I230869 B | 4/2005 |
| WO | 0028482 A1 | 5/2000 |
| WO | WO0215000 A2 | 2/2002 |
| WO | WO2005086090 A2 | 9/2005 |

OTHER PUBLICATIONS

PCT Search Report, Sep. 18, 2007.
Segal., M. et al., "The OpenGL Graphics System: A Specification," pp. 1-368, Version 2.0 (Oct. 22, 2004).
Written Opinion - PCT/US2007/067325, International Search Authority—European Patent Office Sep. 18, 2007.
Bjorke K. "High quality filtering" Chapter 24 in Book 'GPU Gems', [Online] 2004. XP002534488 Retrieved from the Internet: URL:http//http.developer.nvidia.com/GPUGems/gpugems_ch24. html> [retrieved on Jun. 29, 2009].

(56) References Cited

OTHER PUBLICATIONS

Waldspurger et al., Register Relocation: Flexible Contexts for Multithreading, International Symposium on Computer Architecture, Proceedings of the 20th Annual International Symposium on Computer Architecture, 1993.

Deering M et al: "The SAGE graphics architecture" Proceedings of the 29th Annual Conference on Computer Graphics and Interactive Techniques (SIGGRAPH'02), Jul. 23-26, 2002, San Antonio, Texas, USA, 2002, pp. 683-692. XP002534489.

Hadwiger M et al: "Hardware-accelerated high-quality filtering on PC hardware" Proceedings of 2001 Conference on Vision, Modelling and Visualization, Nov. 21-23, 2001, Stuttgart, Germany, [Online] 2001, XP002534490 Retrieved from the Internet: URL:http://wwwvis.informatik.uni-stuttgart.de/vmv01/d1/papers/8.pdf> [retrieved on Jun. 29, 2009].

Hopf MI et al: "Accelerating 3D convolution using graphics hardware" Visualization '99. Proceedings San Francisco, CA, USA Oct. 24-29, 1999, Piscataway, NJ, USA, IEEE, US, Oct. 29, 1999, pp. 471-564, XP031385575 ISBN: 978-0-7803-5897-3.

Novasad J: "Advanced high quality filtering" Chapter 27 in Book 'GPU-Gems 2', [Online]. 2005, XP002534486 Retrieved from the Internet: URL:http://http.developer.nvidia.com/GPUGe ms2/gpugems2_chapter27.html> [retrieved on Jun. 29, 2009].

Ovens J D et al: "A survey of general-purpose computation on graphics hardware" Computer Graphics Forum, vol. 26, No. 1, Mar. 2007, pp. 80-113, XP002534491.

Sigg C et al: "Fast third-order texture filtering" Chapter 20 in Book 'GPU Gems 2', [Online] 2005, XP002534487 Retrieved from the Internet: URL:http://http.developer.nvidia com/GPUGe ms2/gpugems2_chapter20.html> [retrieved on Jun. 29, 2009].

Kilgariff et al.: "Chapter 30, The GeForce 6 Series GPU Architecture," GPU Gems 2 Copyright 2005, pp. 471-491.

Lindholm et al., "A User-Programmable Vertex Engine," Aug. 12-17, 2001; ACM SIGGRAPH; pp. 149-158.

Wynn, Chris; "nVIDIA OpenGL Vertex Programming on Future-Generation GPUs:" May 8, 2004, Nvidia Corporation, pp. 1-97.

Akkary, H. and Driscoll, M. A. 1998. A dynamic multithreading processor. In Proceedings of the 31st Annual ACM/IEEE international Symposium on Microarchitecture (Dallas, Texas, United States). International Symposium on Microarchitecture. IEEE Computer So. 1998, pp. 226-236.

Kenji Watanabe, Wanming Chu, Yamin Li, "Exploiting Java Instruction/Thread Level Parallelism with Horizontal Multithreading," Australasian Computer Systems Architecture Conference, p. 122, 6th Australasian Computer Systems Architecture Conference (AustCSA.) IEEE 2001, pp. 122-129.

Ying Chen, Resit Sendag, David J. Lilja, "Using Incorrect Speculation to Prefetch Data in a Concurrent Multithreaded Processor," Parallel and Distributed Processing Symposium, International, p. 76b, International Parallel and Distributed Processing Sympos., IEEE 2003, pp. 1-9.

Hiroaki Hirata, and 4 others, "An elementary processor Architecture with Parallel Instruction Issuing from Multiple Threads," Information Processing Society article magazine, Information Processing Society of Japan, 1993, vol. 34, No. 4, pp. 595-605.

Sohn, et al., "A 155-mW 50-Mvertices/s Graphics Processor With Fixed-Point Programmable Vertex Shader for Mobile Applications," IEEE Journal of Solid-State Circuits, vol. 41, No. 5, May 2006, pp. 1081-1091.

Onoue, M., et al., "3D Image Handbook", 1st ed., Asakura Publishing Co., Ltd. (Kunizou Asakura), Feb. 20, 2006, pp. 152-170.

* cited by examiner

GRAPHICS SYSTEM WITH CONFIGURABLE CACHES

BACKGROUND

I. Field

The present disclosure relates generally to circuits, and more specifically to a graphics system.

II. Background

Graphics systems are widely used to render 2-dimensional (2-D) and 3-dimensional (3-D) images for various applications such as video games, graphics, computer-aided design (CAD), simulation and visualization tools, imaging, etc. A 3-D image may be modeled with surfaces, and each surface may be approximated with polygons (typically triangles). The number of triangles used to represent a 3-D image is dependent on the complexity of the surfaces as well as the desired resolution of the image and may be quite large, e.g., in the millions. Each triangle is defined by three vertices, and each vertex is associated with various attributes such as space coordinates, color values, and texture coordinates. Each attribute may have up to four components. For example, space coordinates are typically given by horizontal and vertical coordinates (x and y) and depth (z), color values are typically given by red, green, and blue (r, g, b), and texture coordinates are typically given by horizontal and vertical coordinates (u and v).

A graphics processor in a graphics system may perform various graphics operations to render a 2-D or 3-D image. The image is composed of many triangles, and each triangle is composed of picture elements (pixels). The graphics processor renders each triangle by determining the component values of each pixel within the triangle. The graphics operations may include rasterization, stencil and depth tests, texture mapping, shading, etc. Since the graphics processor performs various graphics operations on pixel data, which may be any data associated with pixels, the ability to quickly access the pixel data has a large impact on performance.

SUMMARY

Graphics systems with configurable caches and having good performance are described herein. A graphics system includes a graphics processor and a cache memory system. The graphics processor includes processing units that perform various graphics operations to render graphics images. The cache memory system may include fully configurable caches, partially configurable caches, or a combination of configurable and dedicated caches. A cache is fully configurable if it can be assigned to any one of the processing units that can be assigned with caches. A cache is partially configurable if it can be assigned to any one of a subset of the processing units. A cache is dedicated if it is assigned to a specific processing unit. The caches are fast memories that store data (e.g., pixel data and/or instructions) for the processing units.

The cache memory system may further include a control unit, a crossbar, and an arbiter. The control unit may determine memory utilization by the processing units and assign the configurable caches to the processing units based on memory utilization. The configurable caches may be assigned to achieve good utilization of these caches and to avoid memory access bottleneck at any point within the graphics processor. The crossbar couples the processing units to their assigned caches. The arbiter facilitates data exchanges between the caches and a main memory.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
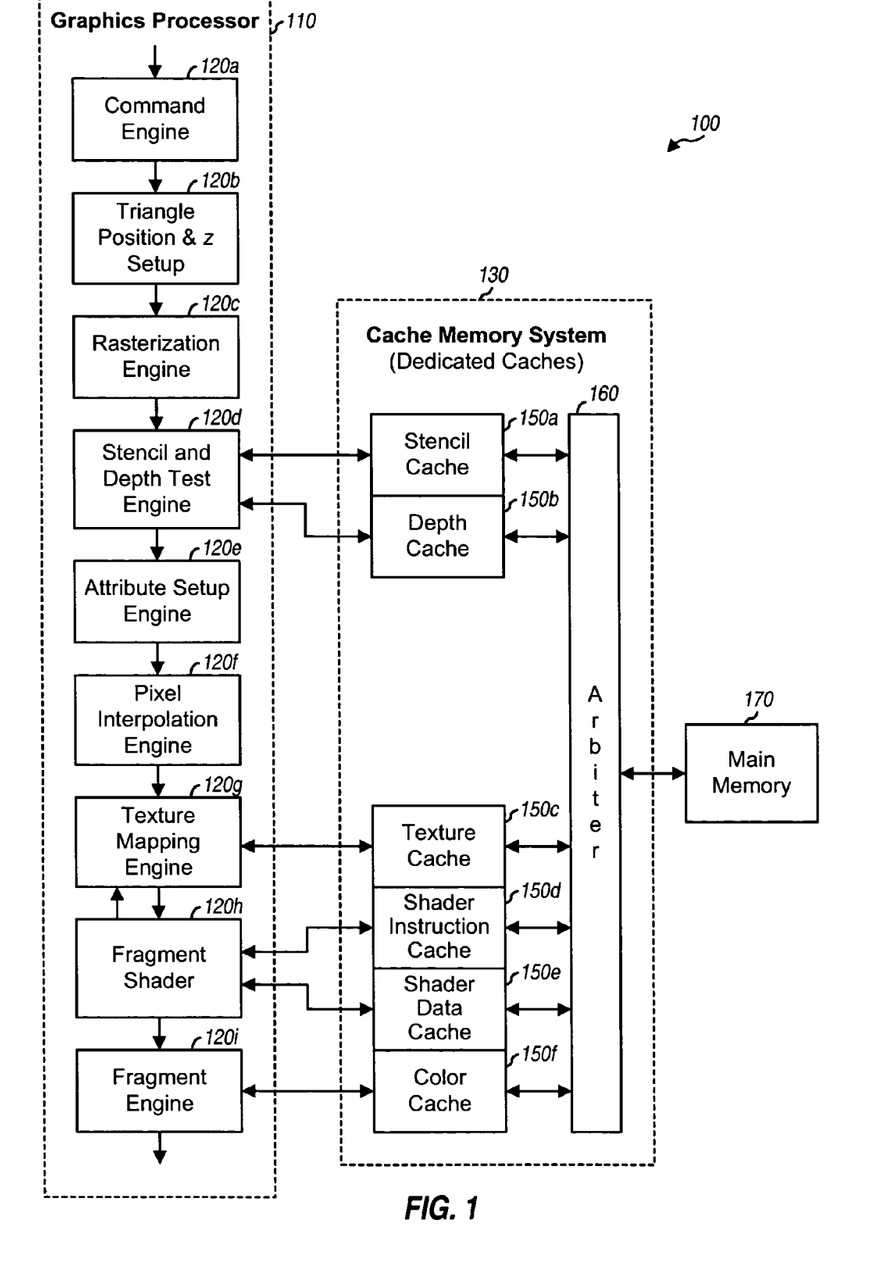
FIG. 1 shows a graphics system with dedicated caches.

FIG. 1 shows a block diagram of a graphics system 100 with dedicated caches. Graphics system 100 includes a graphics processor 110 and a cache memory system 130. Graphics processor 110 includes various processing units arranged in a pipeline and used to render 2-D and 3D images. A command engine 120a receives and decodes incoming commands that specify the graphics operations to be performed. A triangle position and z setup engine 120b computes necessary parameters for the subsequent rasterization process. For example, engine 120b may compute the coefficients of linear equations for the three edges of each triangle, the coefficients for depth (z) gradient, etc. A rasterization engine 120c decomposes each triangle or line into pixels and generates a screen coordinate for each pixel.

A stencil and depth test engine 120d performs a stencil test on each pixel, if enabled, to determine whether the pixel should be displayed or discarded. A stencil buffer (not shown in FIG. 1) stores the current stencil value for each pixel location in the image being rendered. Engine 120d compares the stored stencil value for each pixel against a reference value and retains or discards the pixel based on the outcome of the comparison. Engine 120d also performs a depth test (which is also called a z-test) on each pixel, if applicable, to determine whether the pixel should be displayed or discarded. A z-buffer (not shown in FIG. 1) stores the current z value for each pixel location in the image being rendered. Engine 120d compares the z value of each pixel (the current z value) against the corresponding z value in the z-buffer (the stored z value), displays the pixel and updates the z-buffer and possibly the stencil buffer if the current z value is closer/nearer than the stored z value, and discards the pixel if the current z value is further back than the stored z value.

An attribute setup engine 120e computes necessary parameters for the subsequent interpolation of pixel attributes. For example, engine 120e may compute the coefficients of linear equations for attribute interpolation. A pixel interpolation engine 120f computes attribute component values for each pixel within each triangle based on the pixel's screen coordinate and using the information from engine 120e. A texture mapping engine 120g performs texture mapping, if enabled, to apply texture to each triangle. A texture image may be stored in a texture buffer (not shown in FIG. 1). The three vertices of each triangle may be associated with three (u, v) coordinates in the texture image, and each pixel of the triangle may then be associated with specific texture coordinates in the texture image. Texturing is achieved by modifying the color of each pixel with the color of the texture image at the location indicated by that pixel's texture coordinates.

Each pixel is associated with information such as color, depth, texture, etc. A fragment is a pixel and its associated information. A fragment shader 120h applies software program, which may be composed of a sequence of instructions, to each fragment. Fragment shader 120h may also send texture requests to texture mapping engine 120g. A fragment engine 120i performs functions such as alpha test, fog blending, alpha blending, logic operation, and dithering operation on each fragment and provides results to a color buffer.

The graphics operations shown in FIG. 1 are known in the art. A graphics processor may implement a software interface such as Open Graphics Library (OpenGL), Direct3D, etc. OpenGL is described in a document entitled "The OpenGL® Graphics System: A Specification," Version 2.0, dated Oct. 22, 2004, which is publicly available.

In general, a graphics processor may include any number of processing units for any set of graphics operations. Each processing unit may be an engine that is implemented with dedicated hardware, a processor, or a combination of both. For example, the engines shown in FIG. 1 may be implemented with dedicated hardware whereas the fragment shader may be implemented with a programmable central processing unit (CPU). The processing units may be arranged in various orders depending on the desired optimization. For example, to conserve power, it may be desirable to perform stencil and depth tests early in the pipeline so that pixels that are not visible are discarded early, as shown in FIG. 1. The processing units may also be arranged in other orders, e.g., stencil and depth test engine 120d may be located after texture mapping engine 120g.

Cache memory system 130 includes dedicated caches 150a through 150f for some of the processing units 120 within graphics processor 110. In the design shown in FIG. 1, stencil cache 150a stores stencil values for pixels in a region of the image being rendered, and depth cache 150b stores depth values for pixels in the same or different region. Stencil and depth test engine 120d accesses the stencil values stored in cache 150a and performs stencil tests using these stencil values. Engine 120d also accesses z values stored in cache 150b and performs depth tests using these z values. Texture cache 150c stores a texture mapping table that is used by texture mapping engine 120g to map texture to triangles. Shader instruction cache 150d stores instructions for fragment shader 120h, and shader data cache 150e stores data for fragment shader 120h. Color cache 150f stores color (e.g., red, green, and blue) values for pixels.

An arbiter 160 couples to and facilitates exchanges of data between caches 150a through 150f and a main memory 170. A cache miss is declared whenever a processing unit 120 accesses an associated cache 150 for data and the requested data is not stored in the cache. The cache miss results in the current content of the cache being stored back to main memory 170, if needed, and a new region of data being fetched from main memory 170 and loaded into the cache. The requested data may then be obtained from the cache and provided to the processing unit. Arbiter 160 allows one cache at a time to exchange data with main memory 170.

Cache memory system 130 in FIG. 1 improves memory access performance for graphics system 100. Caches 150 are small, fast memories located close to graphics processor 110. The fast cache memories improve processing speed because processing units 120 can retrieve data and store results faster. Main memory 170 is a large, slower memory located further away (e.g., off-chip) from graphics processor 110. Main memory 170 stores data and instructions that may be loaded into caches 150. Caches 150 reduce the number of fetches from main memory 170 and generally improve the performance of graphics system 100.

FIG. 1 shows the use of dedicated caches. Each cache 150 stores data or instructions for a specific processing unit 120. The utilization of each cache 150 is dependent on the graphics application being executed. For example, a 3-D graphics application may only perform z pass, which may turn on only the depth and/or stencil test. For this application, only stencil cache 150a and/or depth cache 150b may be utilized, and the remaining caches 150c through 150f may be idle. As another example, a simple shader application may not utilize shader instruction cache 150d or shader data cache 150e and these caches may be idle. As yet another example, a graphics application may disable texture mapping, in which case texture cache 150c may not be needed. As seen by these examples, the use of dedicated caches may result in poor utilization of the caches by some graphics applications. The use of dedicated caches may also result in memory access bottleneck occurring in different places for different graphics applications. The bottleneck limits the performance of graphics system 100.

Figure 2:
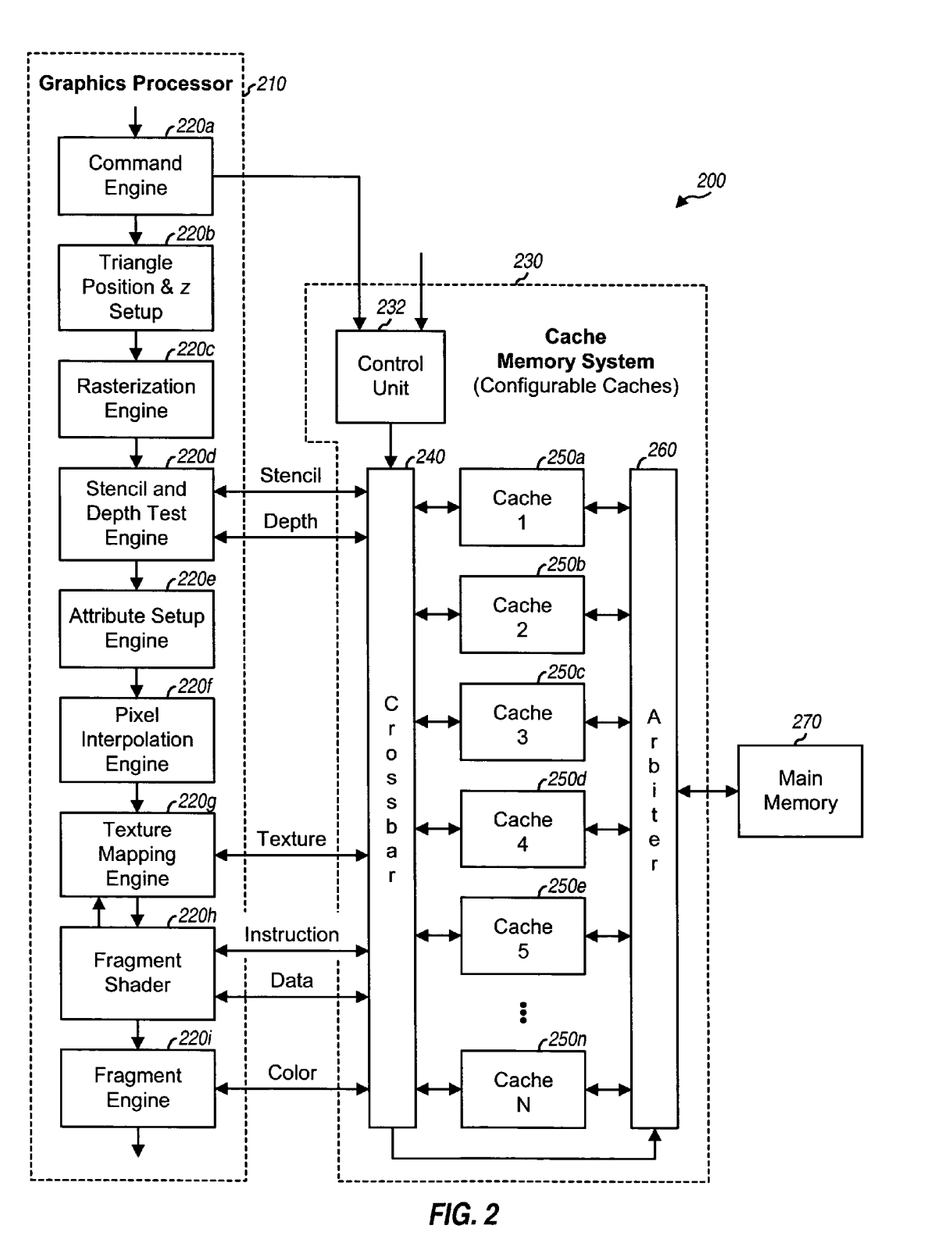
FIG. 2 shows a graphics system with fully configurable caches.

FIG. 2 shows an embodiment of a graphics system 200 with fully configurable caches. Graphics system 200 includes a graphics processor 210 and a cache memory system 230. Graphics processor 210 includes processing units 220a through 220i that may operate as described above for processing units 120a through 120i, respectively, in FIG. 1. As shown in FIG. 2, only some of the processing units may utilize caches to store data and/or instructions. In particular, caches may be used to store stencil and/or depth values for stencil and depth test engine 220d, texture data for texture mapping engine 220g, instructions and/or data for fragment shader 220h, and color values for fragment engine 220i.

Cache memory system 230 includes N fully configurable caches 250a through 250n that may be assigned to store data and/or instructions for processing units 220 within graphics processor 210, where in general N≥1. The caches are fully configurable in that each cache may be assigned to any processing unit that can be assigned with caches. In an embodiment, each cache 250 may be assigned to only one processing unit 220, but a given processing unit 220 may be assigned with zero, one, or multiple caches 250. A control unit 232 assigns the available caches 250a through 250n to stencil and depth test engine 220d, texture mapping engine 220g, fragment shader 220h, and/or fragment engine 220i based on memory utilization by these processing units. A crossbar 240 couples processing units 220d, 220g, 220h, and 220i to their assigned caches 250a through 250n. Crossbar 240 may also be referred to as a cross-switch or some other terminology. An arbiter 260 couples caches 250a through 250n to a main memory 270 and facilitates data exchanges between the caches and the main memory. Arbiter 260 may also be referred to as a selector, a memory interface, or some other terminology.

In general, a cache memory system may include any number of caches that may be of any sizes. The number of caches and their sizes may be selected based on a tradeoff between memory access performance and circuit area. Larger cache sizes result in higher cache hit rates and greater likelihood of the requested data being stored in the caches. However, larger cache sizes also require more circuit area, which may increase cost. In one specific embodiment, cache memory system 230 includes twelve caches 250, and each cache is four kilobytes. In other embodiments, fewer or additional caches as well as other cache sizes may be used for the cache memory system.

Figure 3:
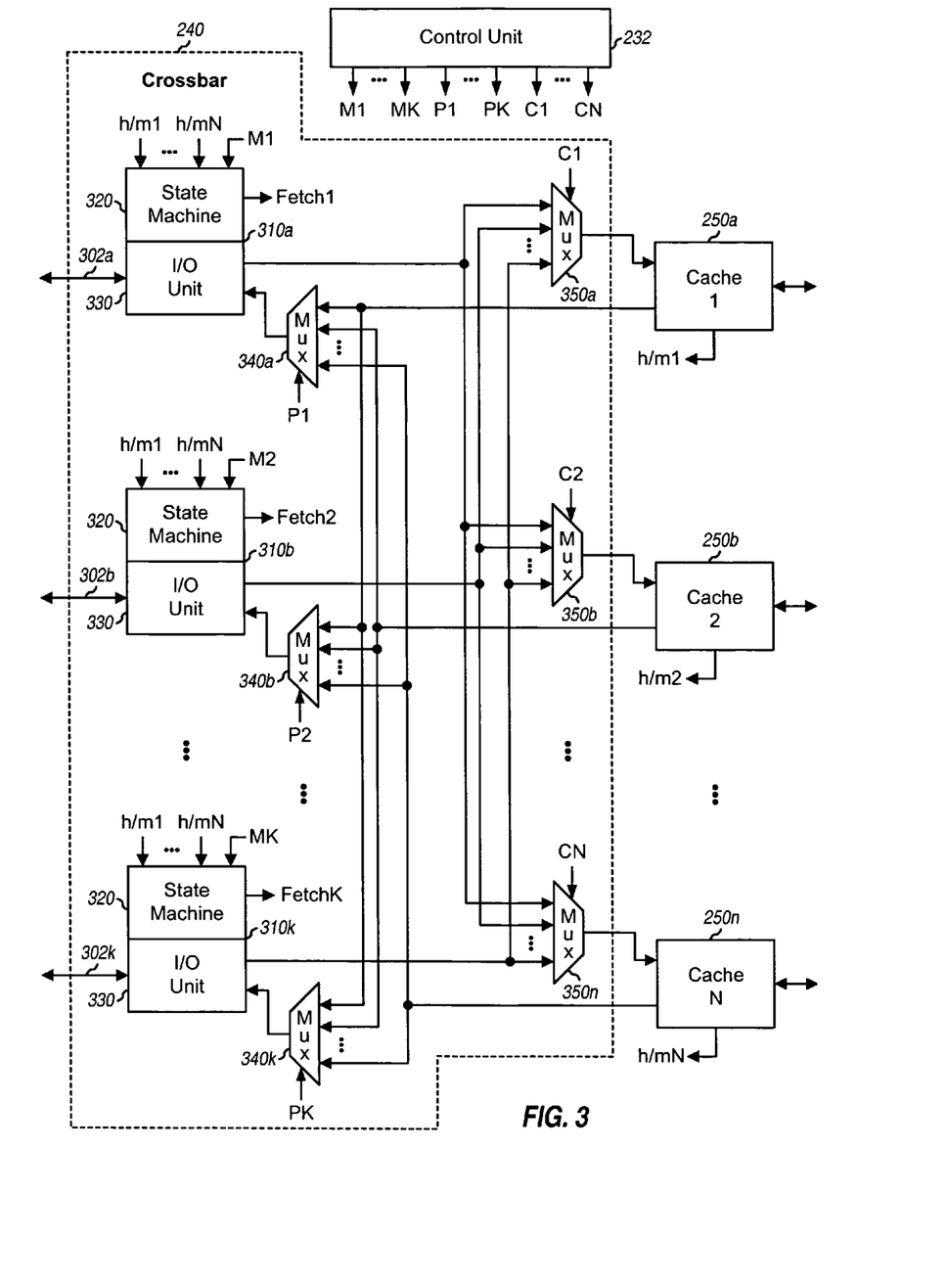
FIG. 3 shows a crossbar in the graphics system in FIG. 2.

FIG. 3 shows a block diagram of an embodiment of crossbar 240 in FIG. 2. In this embodiment, crossbar 240 includes K interface units 310a through 310k, where in general K may be any integer value. The interface units may also be referred to as master units or some other terminology. In the embodiment shown in FIG. 2, K is equal to six, and the six interface units are for stencil, depth, texture, shader instruction, shader data, and color. A given processing unit 220 may interact with one or multiple interface units 310, depending on the data requirements of the processing unit. Crossbar 240 further includes K multiplexers (Mux) 340a through 340k for the K interface units 310a through 310k, respectively, and N multiplexers 350a through 350n for the N caches 250a through 250n, respectively.

Each interface unit 310 couples to an associated processing unit 220 via a respective set of lines 302. Each interface unit 310 includes a state machine 320 and an input/output (I/O) unit 330. For each interface unit 310, I/O unit 330 receives address and/or output data from the associated processing unit 220 via lines 302 and provides the address/data to one input of each of N multiplexers 350a through 350n. I/O unit 330 also receives input data or instructions from an associated multiplexer 340 and provides the data/instructions to the associated processing unit 220 via lines 302.

Each multiplexer 350 receives address/data from all K I/O units 330a through 330k at K inputs. Each multiplexer 350 also receives a respective control Cn from control unit 232 and provides the address/data from one input, as determined by the control Cn, to the associated cache 250. Each multiplexer 350 thus couples one interface unit 310 to the associated cache 250.

Each multiplexer 340 receives input data or instructions from all N caches 250a through 250n at N inputs. Each multiplexer 340 also receives a respective control Pk from control unit 232 and provides the data/instructions from one input, as determined by the control Pk, to the associated I/O unit 330. Each multiplexer 340 thus couples one cache 250 to the associated interface unit 310.

Each cache 250 receives an address from the associated multiplexer 350 and determines whether the requested data/instruction at that address is stored in the cache. Each cache 250 provides a hit/miss (h/m) indicator that indicates a cache hit (e.g., logic high) if the requested data/instruction is stored in the cache or a cache miss (e.g., logic low) if the requested data/instruction is not stored in the cache. Each cache 250 provides the requested data/instruction if there is a cache hit. Each cache 250 waits for a fetch from main memory 270 and then provides the requested data/instruction if there is a cache miss.

For each interface unit 310, state machine 320 receives the hit/miss indicators from all N caches 250a through 250n and a control Mk that indicates which caches, if any, have been assigned to that interface unit. State machine 320 determines whether the requested data/instruction is stored in any of the assigned caches based on the hit/miss indicators for the assigned caches. State machine 320 generates a fetch command if the requested data/instruction is not stored in any of the assigned caches.

Control unit 232 generates controls M1 through MK for state machines 320a through 320k, respectively, controls P1 through PK for multiplexers 340a through 340k, respectively, and controls C1 through CN for multiplexers 350a through 350n, respectively. These controls determine which caches, if any, are assigned to each interface unit 310.

FIG. 3 shows an embodiment of crossbar 240 for fully configurable caches. In general, full configurability of the caches may be achieved by using multiplexers with sufficient number of inputs, designing the state machines to evaluate any possible cache assignment, and generating the proper controls for the state machines and the multiplexers. Crossbar 240 may also be implemented with other designs that can map the processing units to the available caches.

Figure 4:
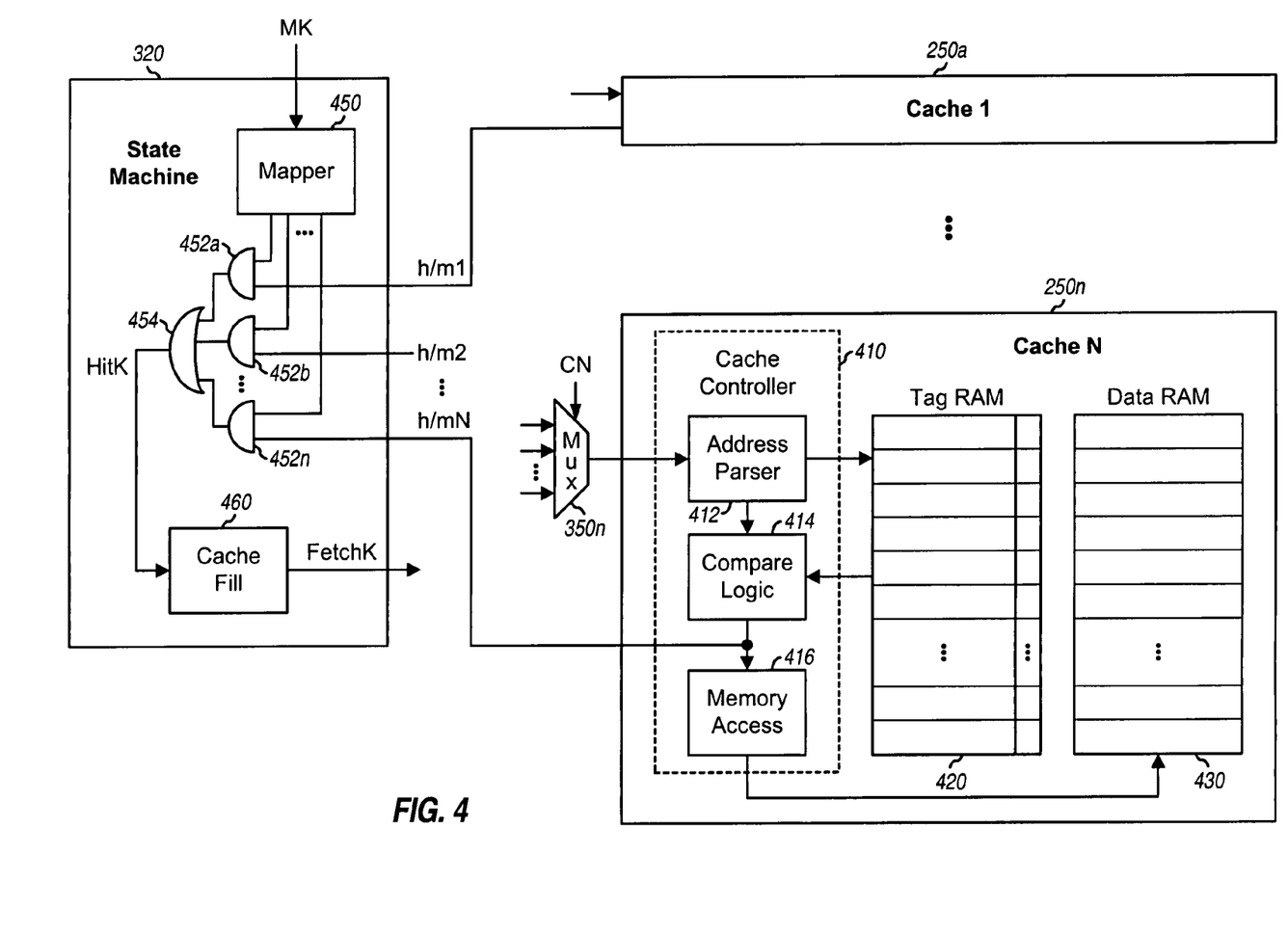
FIG. 4 shows a cache and a state machine for a processing unit.

FIG. 4 shows a block diagram of an embodiment of cache 250n and state machine 320 for interface unit 310k in FIG. 3. Cache 250n includes a cache controller 410, a tag RAM 420, and a data RAM 430. Cache controller 410 performs address checking for each access of cache 250n and ensures that the correct data/instruction is being accessed. Tag RAM 420 keeps track of which data/instructions are currently stored in cache 250n. Data RAM 430 stores the data/instructions. Each line of data RAM 430 may store data for one or more pixels or one or more instructions depending on whether cache 250n is configured to store data or instructions.

Cache 250n may be implemented with a direct map cache structure or an M-way set associate cache structure. For the direct map cache structure, each line of a memory at the next level (e.g., main memory 270) may be mapped to only one line of data RAM 430. Each line of data RAM 430 (or each cache line) is associated with a tag in tag RAM 420 that identifies the specific line of main memory 270 being stored in that cache line. As an example, if main memory 270 has 256 k lines and data RAM 430 has 4 k lines, then each cache line is associated with a specific 12-bit address, and 32 lines of main memory 270 are mapped to each cache line. The specific line of main memory 270 being stored in each cache line may then be identified by a 12-bit address for the cache line and a 5-bit tag that indicates which one of the 32 lines of main memory 270 is stored in the cache line. For the M-way set associate cache structure, each line of main memory 270 may be mapped to any one of M possible lines of data RAM 430. In general, the tag structure may be dependent on the main memory size, the cache size, the cache structure, the size of each cache line, and/or other factors.

Tag RAM 420 stores a tag for each line of data RAM 430 and is updated whenever any line in data RAM 430 is replaced. The tag for each cache line indicates the line of main memory 270 being stored in that cache line. Within control unit 410, an address parser 412 receives from multiplexer 350n an address for a memory access by a processing unit 220, parses the address to obtain a target tag and a cache line address, provides the cache line address to tag RAM 420, and provides the target tag to a compare logic 414. Tag RAM 420 provides the stored tag for the cache line address from parser 412. Compare logic 414 compares the stored tag against the target tag, indicates a cache hit if the tags are equal, and indicates a cache miss if the tags are different. Tag RAM 420 may be accessed multiple times if cache 250n implements the M-way set associate cache structure.

Memory access unit 416 handles access of data RAM 430 when there is a cache hit. If the memory access is a read, then data RAM 430 is accessed to read the data/instruction stored at the cache line address. If the memory access is a write, then data RAM 430 is written at the cache line address and a cache "dirty bit" is updated to indicate that the cache line has been written to, so that the line will be written back to main memory 270 prior to being replaced.

State machine 320 for interface unit 310k determines whether the requested data/instruction is stored in any cache assigned to that interface unit. Within state machine 320, a mapper 450 receives the control MK from control unit 232 and generates N enable signals for the N caches 250a through 250n. Each enable signal is set to logic high if the associated cache 250 is assigned to interface unit 310k. N AND gates 452a through 452n receive the N enable signals and N hit/miss indicators from N caches 250a through 250n, respectively. Each AND gate 452 provides either (1) a logic low if its enable signal is at logic low, which indicates that the associated cache 250 is not assigned to interface unit 310k, or (2) the hit/miss indicator from the associated cache 250 if the enable signal is at logic high, which indicates that the cache is assigned to interface unit 310k. An OR gate 454 receives the outputs of AND gates 452a through 452n and generates a hit indicator for interface unit 310k.

A cache fill unit 460 directs a cache fill of one of the caches assigned to interface unit 310k when there is a cache miss. In an embodiment, an assigned cache that is least recently used (LRU), i.e., unused for the longest time, is selected for the cache fill. Cache fill unit 460 may fill all or a portion of the selected cache with new data/instructions from main memory 270. Interface unit 310k may be stalled while the target cache line is filled from main memory 270 and the tag RAM of the selected cache is updated to reflect the new data/instructions loaded into the data RAM.

A graphics system with fully configurable caches provides the most flexibility in terms of assigning caches to processing units. A given processing unit may be assigned with zero, one, multiple, or even all of the available caches, depending on data requirements of the processing units. The available caches may be assigned to the processing units in a manner to achieve good utilization of the caches and to avoid memory access bottleneck at any one place in the graphics processor regardless of the graphics application being executed. The available caches may be intelligently assigned to processing units as described below.

In many instances, good performance may be achieved with partially configurable caches. The caches are partially configurable in that each cache may be assigned to one of a subset of processing units. Studies have been performed on various graphics applications to ascertain the benefits of using caches for different graphics operations. These studies indicate that caches are very useful in boosting performance of stencil and depth tests and texture mapping for many graphics applications and are only somewhat beneficial for color and shader. Hence, a cache memory system may be designed with many of the available caches being configurable for stencil and depth tests and texture mapping and only few of the caches being configurable for color and shader. Employing partially configurable caches may simplify the designs of the control unit that assigns the configurable caches as well as the crossbar that couples the processing units to their assigned caches.

Figure 5:
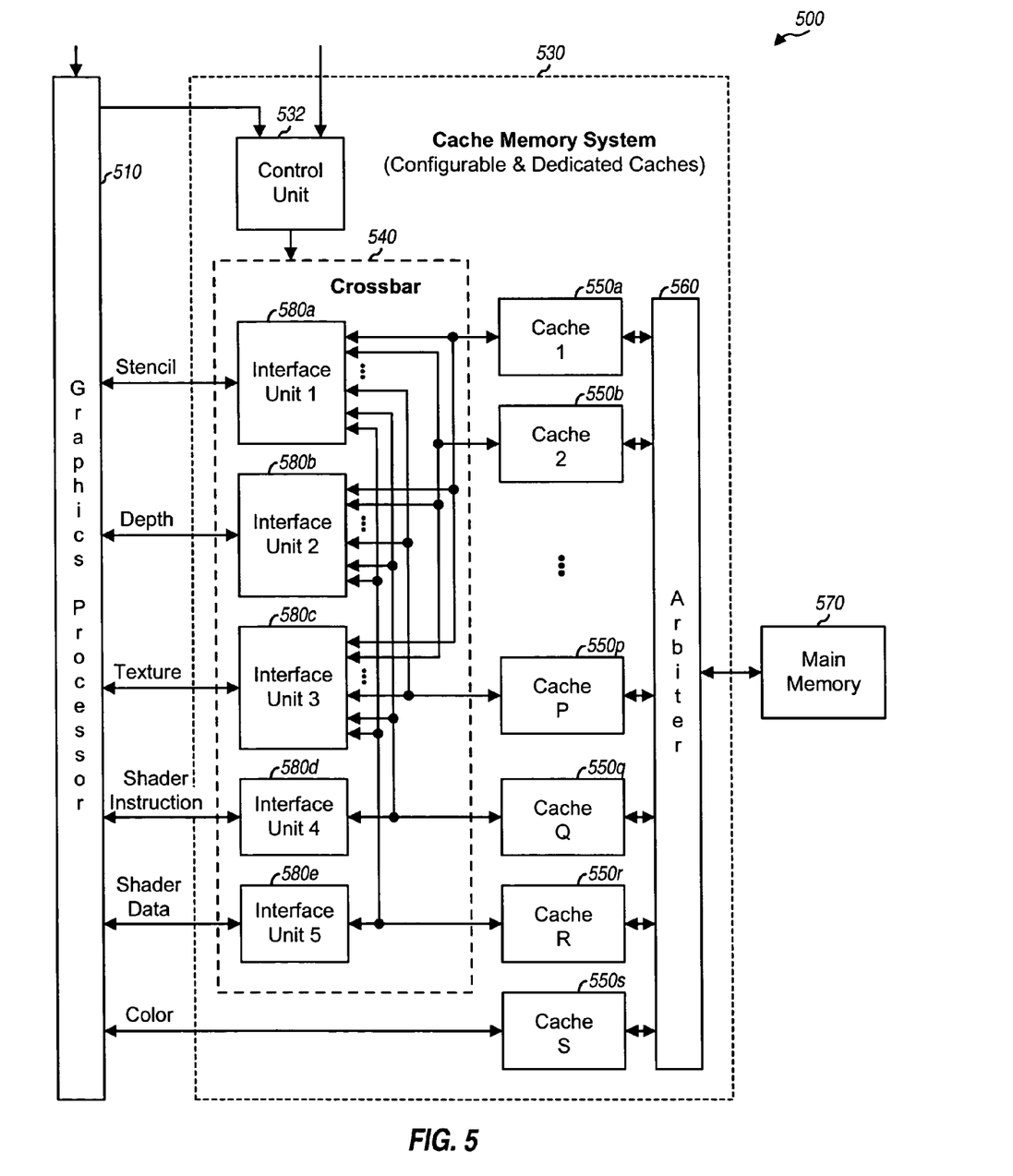
FIG. 5 shows a graphics system with configurable and dedicated caches.

FIG. 5 shows an embodiment of a graphics system 500 with configurable and dedicated caches. Graphics system 500 includes a graphics processor 510 and a cache memory system 530. Graphics processor 510 may include processing units that operate as described above for processing units 120a through 120i in FIG. 1. In particular, graphics processor 510 may include a stencil and depth test engine, a texture mapping engine, a fragment shader, and a fragment engine that may utilize data and/or instructions stored in caches.

In the embodiment shown in FIG. 5, cache memory system 530 includes R partially configurable caches 550a through 550r and one dedicated cache 550s, where in general R≥1. Table 1 shows possible assignments of each of caches 550a through 550s, where each "X" indicates a valid cache assignment. As shown in Table 1, each of the P partially configurable caches 550a through 550p may be assigned for stencil test, depth test, or texture mapping. Partially configurable cache 550q may be assigned for shader instruction, stencil test, depth test, or texture mapping. Partially configurable cache 550r may be assigned for shader data, stencil test, depth test, or texture mapping. Dedicated cache 550s is used to store color values for the fragment engine. In an embodiment, P=8, and up to 10 caches may be assigned for stencil test, depth test, and/or texture mapping, assuming that caches 550q and 550r are not used for shader instructions and data. Fewer or additional caches may also be used for cache memory system 530.

TABLE 1

| Processing Unit | Cache 550a | ... | Cache 550p | Cache 550q | Cache 550r | Cache 550s |
|---|---|---|---|---|---|---|
| Stencil test | X | ... | X | X | X | |
| Depth test | X | ... | X | X | X | |
| Texture mapping | X | ... | X | X | X | |
| Shader instruction | | | | X | | |
| Shader data | | | | | X | |
| Color | | | | | | X |

A control unit 532 assigns the configurable caches 550a through 550r to the stencil and depth test engine, the texture mapping engine, and/or the fragment shader based on memory utilization by these processing units. A crossbar 540 couples the processing units to their assigned caches 550a through 550r. An arbiter 560 couples caches 550a through 550s to a main memory 570.

FIG. 5 also shows an embodiment of crossbar 540. In this embodiment, crossbar 540 includes interface units 580a through 580e for stencil test, depth test, texture mapping, shader instruction, and shader data, respectively. Interface unit 580a couples the stencil and depth test engine to caches assigned for stencil test, if any, among caches 550a through 550r. Interface unit 580b couples the stencil and depth test engine to caches assigned for depth test, if any, among caches 550a through 550r. Interface unit 580c couples the texture mapping engine to assigned caches, if any, among caches 550a through 550r. Interface unit 580d couples the fragment shader to cache 550q, if assigned. Interface unit 580e couples the fragment shader to cache 550r, if assigned. Each interface unit 580 may include a state machine and an I/O unit, e.g., as shown in FIG. 3. For simplicity, the multiplexers for the interface units and the multiplexers for the caches are not shown in FIG. 5.

FIG. 5 shows a specific embodiment of a cache memory system with configurable and dedicated caches. In general, a cache memory system may include any number of configurable caches and any number of dedicated caches. The configurable caches may be used for any set of graphics operations, and the dedicated caches may also be used for any set of graphics operations. The use of both configurable and dedicated caches may simplify the designs of the control unit and the crossbar.

In the embodiments shown in FIGS. 2 and 5, the control unit may assign the configurable caches to the processing units in various manners. In one embodiment, the control unit assigns caches for each graphics image or frame to be rendered based on memory utilization in a prior image/frame. The control unit may ascertain memory utilization by counting the number of memory accesses made by each processing unit, the number of cache hits for each cache, the number of cache misses for each cache, etc. The control unit may then assign more caches to processing units with high memory utilization and fewer or no caches to processing units with low memory utilization.

In another embodiment, the control unit assigns the configurable caches to the processing units based on coherency of graphics images/frames. Coherency refers to the amount of changes in consecutive 2D/3D frames. Fewer caches may be assigned for higher coherency when frames are more likely to render similar contents, and more caches may be assigned for less coherency.

In yet another embodiment, the control unit assigns the configurable caches to the processing units based on characteristics of the graphics application being executed. For example, if the graphics system is executing a 2-D graphics application, then depth test may not be needed, and no cache may be assigned for depth test. On the other extreme, if a 3-D graphics application uses only z pass, then all configurable caches may be assigned to depth test. As another example, if a simple shader program is being executed and all of the shader instructions can be stored within the fragment shader, then no cache may be assigned to the fragment shader.

In yet another embodiment, the control unit dynamically assigns the configurable caches. For example, the control unit may assign one or more caches to a processing unit when data requests are sent by the processing unit. The control unit may adjust the number of caches assigned to the processing unit based on the number of requests, cache hit/miss statistics, and/or other factors, which may be determined on the fly. Flush and invalidate operations may be performed on the fly for a cache that is switched or re-assigned from one processing unit to another processing unit.

In yet another embodiment, the control unit assigns caches using a combination of static and dynamic assignments. For example, the control unit may pre-assign one or more caches to a given processing unit at the beginning of rendering a frame, image, or batch, e.g., based on current statistics on memory utilization by the processing unit. The control unit may adjust the cache assignment to this processing unit during the rendering of the frame, image, or batch, e.g., periodically. The new cache assignment for each rendering period may be determined based on the statistics obtained for the prior rendering period.

The control unit may also assign the configurable caches based on other criteria. The control unit may assign caches in each image/frame, whenever changes in memory utilization are detected, when a graphics application is first executed, and/or at other times.

For simplicity, FIGS. 1 through 5 show the cache memory systems including a bank of caches. A cache may be implemented with a block of memory. A cache or a cache memory system may also be implemented with a hierarchical structure having multiple levels, e.g., level 1, level 2, level 3, etc. The caches in a lower level (e.g., level 1) tend to be faster but smaller than the caches in a higher level (e.g., level 2). The caches in each level may be filled by the caches in the next higher level whenever cache misses occur. The number of levels, the number of caches in each level, and the cache sizes for the different levels may be fixed or configurable. For example, the number of levels, the number of caches in each level, and/or the cache sizes may be selected to achieve good performance and may be configurable based on the characteristics of the graphics applications.

Figure 6:
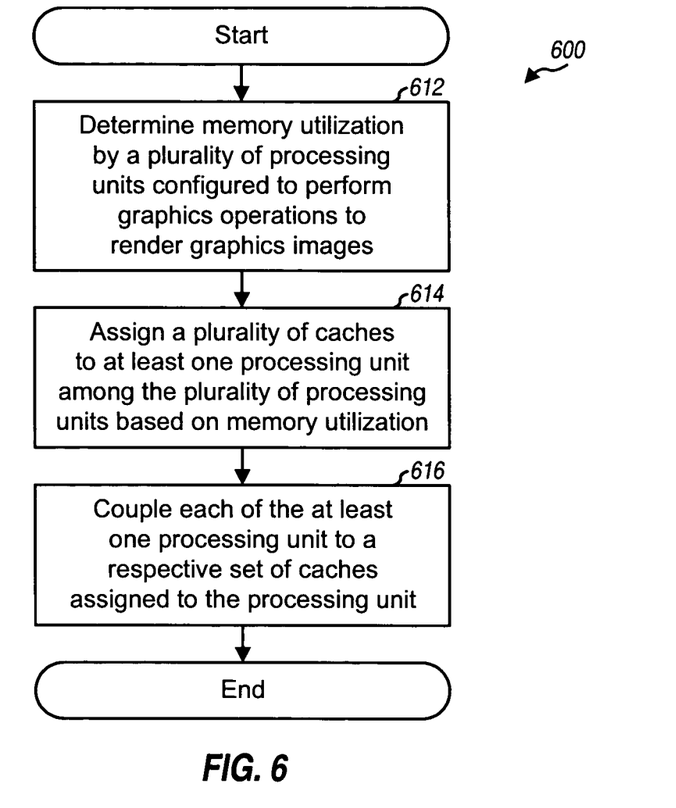
FIG. 6 shows a process to operate a graphics system with configurable caches.

FIG. 6 shows an embodiment of a process 600 for operating a graphics system with configurable caches. Memory utilization by a plurality of processing units configured to perform graphics operations to render graphics images is determined (block 612). Memory utilization may be determined by monitoring memory accesses made by the processing units, by ascertaining the characteristics of the graphics application being executed, and/or in other manners. A plurality of caches are assigned to at least one processing unit among the plurality of processing units based on memory utilization (block 614). Each processing unit may be assigned with zero, one, multiple, or all of the caches depending on (1) memory utilization by that processing unit as well as the other processing units and (2) the caches available for assignment to that processing unit. Memory utilization may be ascertained based on various statistics such as, e.g., data requests by the processing unit, cache hit/miss statistics, etc. The cache assignment may be performed periodically (e.g., every graphics image/frame), whenever a change in memory utilization is detected, etc. The caches may also be re-assign during rendering of an image/frame based on detected changes in memory utilization. Each of the at least one processing unit is coupled to a respective set of caches assigned to the processing unit, e.g., via a respective interface unit (block 616).

The graphics systems and configurable caches described herein may be used for wireless communication, computing, networking, personal electronics, etc. An exemplary use of a graphics system with configurable caches for wireless communication is described below.

Figure 7:
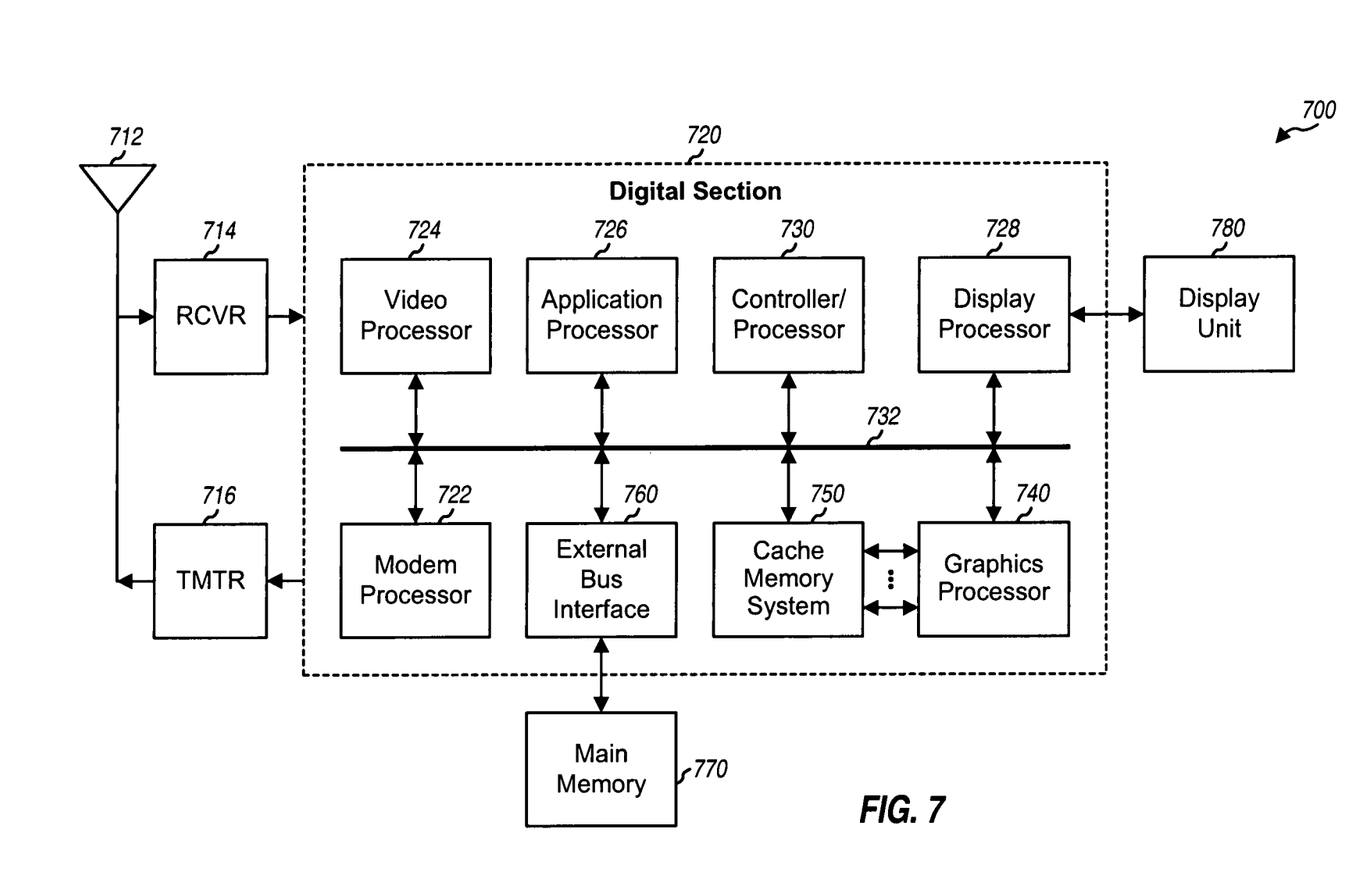
FIG. 7 shows a wireless device in a wireless communication system.

FIG. 7 shows a block diagram of an embodiment of a wireless device 700 in a wireless communication system. Wireless device 700 may be a cellular phone, a terminal, a handset, a personal digital assistant (PDA), or some other device. The wireless communication system may be a Code Division Multiple Access (CDMA) system, a Global System for Mobile Communications (GSM) system, or some other system.

Wireless device 700 is capable of providing bi-directional communication via a receive path and a transmit path. On the receive path, signals transmitted by base stations are received by an antenna 712 and provided to a receiver (RCVR) 714. Receiver 714 conditions and digitizes the received signal and provides samples to a digital section 720 for further processing. On the transmit path, a transmitter (TMTR) 716 receives data to be transmitted from digital section 720, processes and conditions the data, and generates a modulated signal, which is transmitted via antenna 712 to the base stations.

Digital section 720 includes various processing and interface units such as, for example, a modem processor 722, a video processor 724, an application processor 726, a display processor 728, a controller/processor 730, a graphics processor 740, and an external bus interface (EBI) 760. Modem processor 722 performs processing for data transmission and reception (e.g., encoding, modulation, demodulation, and decoding). Video processor 724 performs processing on video content (e.g., still images, moving videos, and moving texts) for video applications such as camcorder, video playback, and video conferencing. Application processor 726 performs processing for various applications such as multi-way calls, web browsing, media player, and user interface. Display processor 728 performs processing to facilitate the display of videos, graphics, and texts on a display unit 780. Controller/processor 730 may direct the operation of various processing and interface units within digital section 720.

Graphics processor 740 performs processing for graphics applications and may be implemented as described above. A cache memory system 750 stores data and/or instructions for graphics processor 740 and may be implemented with configurable caches and possibly dedicated caches. Cache memory system 750 may further include a crossbar that couples the configurable caches to the processing units within graphics processor 740 and an arbiter that couples the caches to a main memory 770 via a bus 732 and EBI 760. EBI 760 facilitates transfer of data between digital section 720 (e.g., the caches) and main memory 770.

Digital section 720 may be implemented with one or more digital signal processors (DSPs), micro-processors, reduced instruction set computers (RISCs), etc. Digital section 720 may also be fabricated on one or more application specific integrated circuits (ASICs) or some other type of integrated circuits (ICs).

The graphics systems and configurable caches described herein may be implemented in various hardware units. For example, the graphics systems and configurable caches may be implemented in ASICs, digital signal processing device (DSPDs), programmable logic devices (PLDs), field programmable gate array (FPGAs), processors, controllers, micro-controllers, microprocessors, and other electronic units.

Certain portions of the graphics systems may be implemented in firmware and/or software. For example, the control unit may be implemented with firmware and/or software modules (e.g., procedures, functions, and so on) that perform the functions described herein. The firmware and/or software codes may be stored in a memory (e.g., memory 770 in FIG. 7) and executed by a processor (e.g., processor 730). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
a plurality of processing units arranged in a pipeline, the plurality of processing units configured to perform graphics operations to render graphics images;
a plurality of caches configured to store data for the plurality of processing units;
a crossbar configured to couple the plurality of caches to the plurality of processing units;
a control unit configured to ascertain memory utilization by the plurality of processing units and to pre-assign one or more of the plurality of caches to a selected processing unit of the plurality of processing units at the beginning of rendering a frame, image, or batch based on the memory utilization statistics, so that the one or more caches is coupled exclusively to the selected processing unit.

2. The apparatus of claim 1, wherein each of the plurality of caches is assignable to any one of a respective subset of the plurality of processing units.

3. The apparatus of claim 1, wherein the plurality of caches comprise one or more dedicated caches exclusively assigned to the processing unit and at least one configurable cache exclusively assignable to any one of the remaining processing units.

4. The apparatus of claim 3, wherein each configurable cache is assignable to any one of a respective subset of the remaining processing units.

5. The apparatus of claim 3, wherein the remaining processing units comprise a depth test engine and a texture mapping engine.

6. The apparatus of claim 1, wherein the control unit is configured to assign the plurality of caches for each graphics image to be rendered based on memory utilization for a prior graphics image.

7. The apparatus of claim 1, wherein the control unit is configured to ascertain memory utilization based on data requests by the processing units, cache hit/miss statistics, or a combination thereof.

8. The apparatus of claim 1, wherein the control unit is configured to detect changes in memory utilization by the plurality of processing units during rendering of an image and to re-assign the plurality of caches based on the detected changes in memory utilization.

9. The apparatus of claim 1, wherein the control unit is configured to exclusively assign the one or more of the plurality of caches to the processing unit based on memory utilization by a graphics application being executed.

10. The apparatus of claim 1, wherein the crossbar comprises
a plurality of interface units, each interface unit configured to couple an associated processing unit to a set of caches assigned to the processing unit.

11. The apparatus of claim 10, wherein each interface unit comprises a state machine configured to determine whether data requested by the associated processing unit is stored in any one of the set of caches assigned to the processing unit.

12. The apparatus of claim 11, wherein the state machine for each interface unit receives cache hit/miss indicators from the plurality of caches and a control indicating the set of caches assigned to the associated processing unit.

13. The apparatus of claim 11, wherein the state machine for each interface unit is configured to fill one of the set of caches assigned to the associated processing unit when a cache miss occurs.

14. The apparatus of claim 1, wherein the plurality of caches are arranged in a hierarchical structure with at least two levels of caches.

15. The apparatus of claim 14, wherein at least one level in the hierarchical structure has a configurable number of caches.

16. The apparatus of claim 14, wherein at least one level in the hierarchical structure has configurable cache sizes.

17. The apparatus of claim 1, wherein the plurality of caches are arranged in a configurable number of levels in a hierarchical structure.

18. The apparatus of claim 1, wherein the plurality of caches have configurable cache sizes.

19. The apparatus of claim 1, further comprising:
an arbiter coupled to the plurality of caches and configured to facilitate data exchanges between the plurality of caches and a main memory.

20. The apparatus of claim 1, wherein the plurality of processing units comprise a depth test engine and a texture mapping engine.

21. The apparatus of claim 20, wherein the plurality of processing units are arranged in a pipeline, and wherein the depth test engine is located earlier in the pipeline than the texture mapping engine.

22. An integrated circuit comprising:
a plurality of processing units arranged in a pipeline, the plurality of processing units configured to perform graphics operations to render graphics images;
a plurality of caches configured to store data for the plurality of processing units;
a crossbar configured to couple the plurality of caches to the plurality of processing units; and
a control unit configured to ascertain memory utilization by the plurality of processing units and to pre-assign one or more of the plurality of caches to a selected processing unit of the plurality of processing units at the beginning of rendering a frame, image, or batch based on the memory utilization statistics, so that the one or more caches is coupled exclusively to the selected processing unit.

23. A wireless device comprising:
a graphics processor comprising a plurality of processing units arranged in a pipeline, the plurality of processing units configured to perform graphics operations to render graphics images; and
a cache memory system comprising
a plurality of caches configured to store data for the plurality of processing units, and
a crossbar configured to couple the plurality of caches to the plurality of processing units; and
a control unit configured to ascertain memory utilization by the plurality of processing units and to pre-assign one or more of the plurality of caches to a selected processing unit of the plurality of processing units at the beginning of rendering a frame, image, or batch based on the memory utilization statistics, so that the one or more caches is coupled exclusively to the selected processing unit.

24. The wireless device of claim 23, wherein the cache memory system further comprises
an arbiter coupled to the plurality of caches and configured to facilitate data exchanges between the plurality of caches and a main memory.

25. A method comprising:
determining memory utilization statistics by a plurality of processing units arranged in a pipeline, the plurality of processing units configured to perform graphics operations to render graphics images;
pre-assigning a plurality of caches to a processing unit among the plurality of processing units at the beginning of rendering a frame, image, or batch based on the memory utilization statistics by the plurality of processing units; and
exclusively coupling the processing unit to the plurality of caches based on the pre-assigning.

26. The method of claim 25, further comprising:
coupling one or more caches directly to the processing unit among the plurality of processing units.

27. The method of claim 25, wherein the exclusively assigning the plurality of caches comprises
exclusively assigning the plurality of caches to the processing unit for each graphics image to be rendered based on memory utilization for a prior graphics image.

28. An apparatus comprising:
means for determining memory utilization statistics by a plurality of processing units arranged in a pipeline, the plurality of processing units configured to perform graphics operations to render graphics images;
means for pre-assigning a plurality of caches to a processing unit among the plurality of processing units at the beginning of rendering a frame, image, or batch based on the memory utilization statistics by the plurality of processing units; and
means for exclusively coupling the processing unit to the plurality of caches.

29. The apparatus of claim 28, further comprising:
means for coupling one or more caches directly to the processing unit among the plurality of processing units.

30. The apparatus of claim 28, wherein the means for exclusively assigning the plurality of caches comprises
means for exclusively assigning the plurality of caches to the processing unit for each graphics image to be rendered based on memory utilization for a prior graphics image.

31. A non-transitory computer-readable memory storing code for causing a computer to configure caches comprising:
code for causing a computer to determine memory utilization statistics by a plurality of processing units arranged in a pipeline, the plurality of processing units configured to perform graphics operations to render graphics images;
code for causing a computer to pre-assign a plurality of caches to a processing unit among the plurality of processing units at the beginning of rendering a frame, image, or batch based on the memory utilization statistics by the plurality of processing units; and
code for causing a computer to exclusively couple the processing unit to the plurality of caches based on the pre-assignment.

32. The non-transitory computer-readable memory of claim 31, further comprising:
code for causing a computer to couple one or more caches directly to the processing unit among the plurality of processing units.

33. The non-transitory computer-readable memory of claim 31, wherein the code for causing a computer to exclusively assign the plurality of caches comprises:
code for causing a computer to exclusively assign the plurality of caches to the processing unit for each graphics image to be rendered based on memory utilization for a prior graphics image.

* * * * *